United States Patent
Brockenbrough et al.

(10) Patent No.: US 7,203,286 B1
(45) Date of Patent: Apr. 10, 2007

(54) METHOD AND APPARATUS FOR COMBINING AMBIENT SOUND EFFECTS TO VOICE MESSAGES

(75) Inventors: Allan E. Brockenbrough, Hamilton, MA (US); Thomas W. Hamilton, Wakefield, MA (US); Steven R. Borne, Portsmouth, NH (US)

(73) Assignee: Comverse, Inc., Wakefield, MA (US)

( * ) Notice: Subject to any disclaimer, the term of this patent is extended or adjusted under 35 U.S.C. 154(b) by 876 days.

(21) Appl. No.: 09/679,287

(22) Filed: Oct. 6, 2000

(51) Int. Cl.
*H04M 1/64* (2006.01)
(52) U.S. Cl. .................. 379/76; 379/68; 379/88.16
(58) Field of Classification Search ............. 379/67.1, 379/68, 69, 70, 71, 72, 75, 85, 87, 88.13, 379/88.16, 88.17, 88.22–88.27
See application file for complete search history.

(56) References Cited

U.S. PATENT DOCUMENTS

| | | | |
|---|---|---|---|
| 5,138,925 A | 8/1992 | Koguchi et al. ............... 84/609 |
| 5,187,734 A | 2/1993 | Takahashi et al. ............. 379/79 |
| 5,187,735 A | 2/1993 | Herrero Garcia et al. ....................... 379/88.17 |
| 5,750,911 A | 5/1998 | Tamura ........................ 84/602 |
| 5,844,158 A | 12/1998 | Butler et al. ................... 84/650 |
| 5,860,065 A * | 1/1999 | Hsu ............................ 704/270 |
| 5,865,825 A | 2/1999 | Schlinz ..................... 715/500.1 |
| 5,915,237 A | 6/1999 | Boss et al. ................ 704/270.1 |
| 6,055,500 A | 4/2000 | Terui et al. .................. 704/270 |
| 6,459,774 B1 * | 10/2002 | Ball et al. .................. 379/67.1 |
| 6,549,767 B1 * | 4/2003 | Kawashima .............. 455/412.2 |
| 6,999,565 B1 * | 2/2006 | Delaney et al. .......... 379/88.13 |
| 2001/0050977 A1 * | 12/2001 | Gerszber et al. ......... 379/88.13 |
| 2002/0032752 A1 * | 3/2002 | Gold et al. ................. 709/218 |

FOREIGN PATENT DOCUMENTS

JP 07212475 A * 8/1995

\* cited by examiner

*Primary Examiner*—Ovidio Escalante
(74) *Attorney, Agent, or Firm*—Staas & Halsey LLP (57) ABSTRACT

A voice-mail platform in which a voice message can be combined with a sound sample such that the combined message contains background noise to enhance the persuasiveness of the message. The voice message and the sound sample may be stored either together or separately and can be forwarded from an original recipient to a third party recipient with or without the sound sample. The voice message can be recorded while the user is listening to the selected sound sample. Further, a user can store a personal audio stationary to select sound samples which accompany voice messages.

41 Claims, 9 Drawing Sheets

METHOD AND APPARATUS FOR COMBINING AMBIENT SOUND EFFECTS TO VOICE MESSAGES

BACKGROUND OF THE INVENTION

1. Field of the Invention

The present invention is directed to voice-mail systems and more particularly to allowing a user to select a sound sample to be combined with a voice message to improve the realism of the message and to creatively enhance the message.

2. Description of the Related Art

It is increasingly common for telephone companies to provide information services such as voice-mail to subscribers. Examples of systems which enable public telephone companies to provide such services are described in U.S. Pat. Nos. 5,029,199; 5,193,110; and 5,260,990, all of which are assigned to the Assignee of this application and are incorporated herein by reference.

In the past, if a user wished to enhance their voice-mail message by adding music or other sound recordings, their only option was to play such sound in the background while they spoke the voice-mail message and hoped that the sound was captured in the recording of the voice-mail message. However, this technique provides added difficulties for the user and produces poor results.

SUMMARY OF THE INVENTION

It is an object of the present invention to combine ambient noise with a recorded voice message automatically.

It is a further object of the present invention to allow the user to manipulate various sounds to be combined with the voice-mail message in order to improve the persuasiveness of the message.

It is a still further object of the invention to store a sound sample separate from a stored voice message where when the voice message is accessed, the separately stored sound file is retrieved and combined with the voice message.

Another object of the invention is to store the sound sample together, but uncombined, with the voice message, where the sound sample and the voice message are combined when the message is reproduced.

Another object of the invention is to provide a web interface to allow a user to provide their own sound samples to be stored with an identifier corresponding to that user for future use.

Another object of the invention is to provide audio stationary unique to a particular user which may accompany any voice message left by that user.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
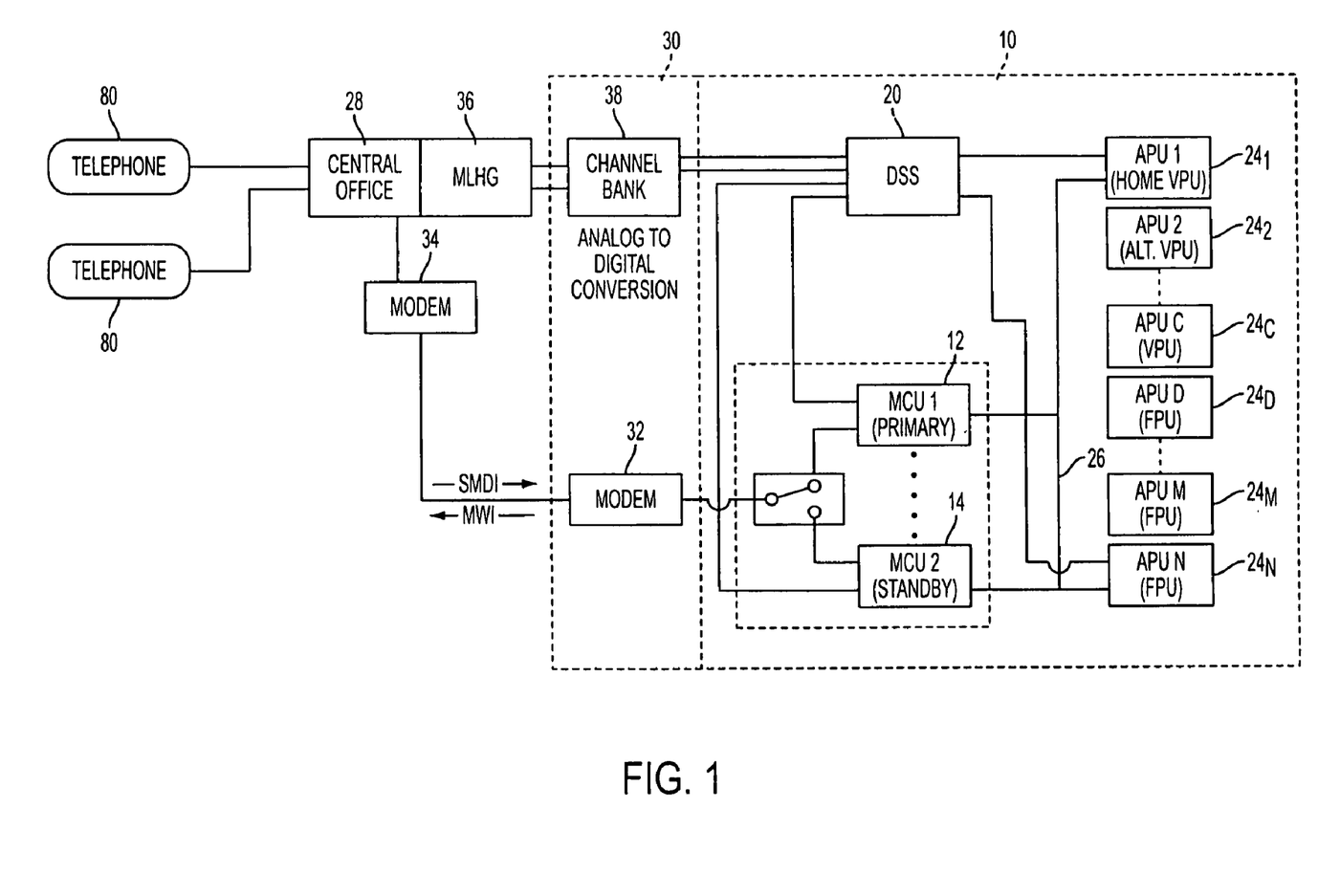
FIG. 1 is a block diagram of a data processing system for providing information services.

FIG. 1 is a block diagram of a data processing system for providing information services. Referring to FIG. 1, the information services system 10 is controlled by a master control unit (MCU) which preferably is provided in tandem as a primary MCU1 12 and a standby MCU2 14. The MCU includes storage for a database containing system configuration data and subscriber information including a mailbox with addresses of the messages stored for each subscriber. The MCU controls operation of a digital switching system (DSS) 20 and a plurality of application processing units (APUs) 24 which may include voice processing units (VPUs) $24_1$–$24_c$ and other APUs such as facsimile processing units (FPUs) $24_D$–$24_N$. The MCUs 12, 14 and APUs 24 are connected via a network connection 26 to form a local area network, preferably using an ETHERNET.

The information services system 10 is connected to a central office 28 via one or more T1 lines if the central office 28 is a digital switch and via analog/digital conversion unit 30 if the central office 28 is an analog switch. Modems 32, 34 are used to provide information regarding telephone callers to the information services system using the system message desk interface (SMDI) and to provide a message waiting indication (MWI) from the information services system 10 to the central office 28. The digital switching system 20 in the information services system 10 is connected to the central office via a multi-line hunt group (MLHG) 36 and a channel bank 38 (if the central office 28 is an analog switch). In alternative embodiments of the information services system 10, other interfaces, such as common channel signalling system number 7 (SS7) and integrated services digital network (ISDN) may be used to transmit the information provided by SMDI and MWI in the illustrated embodiment.

Figure 2:
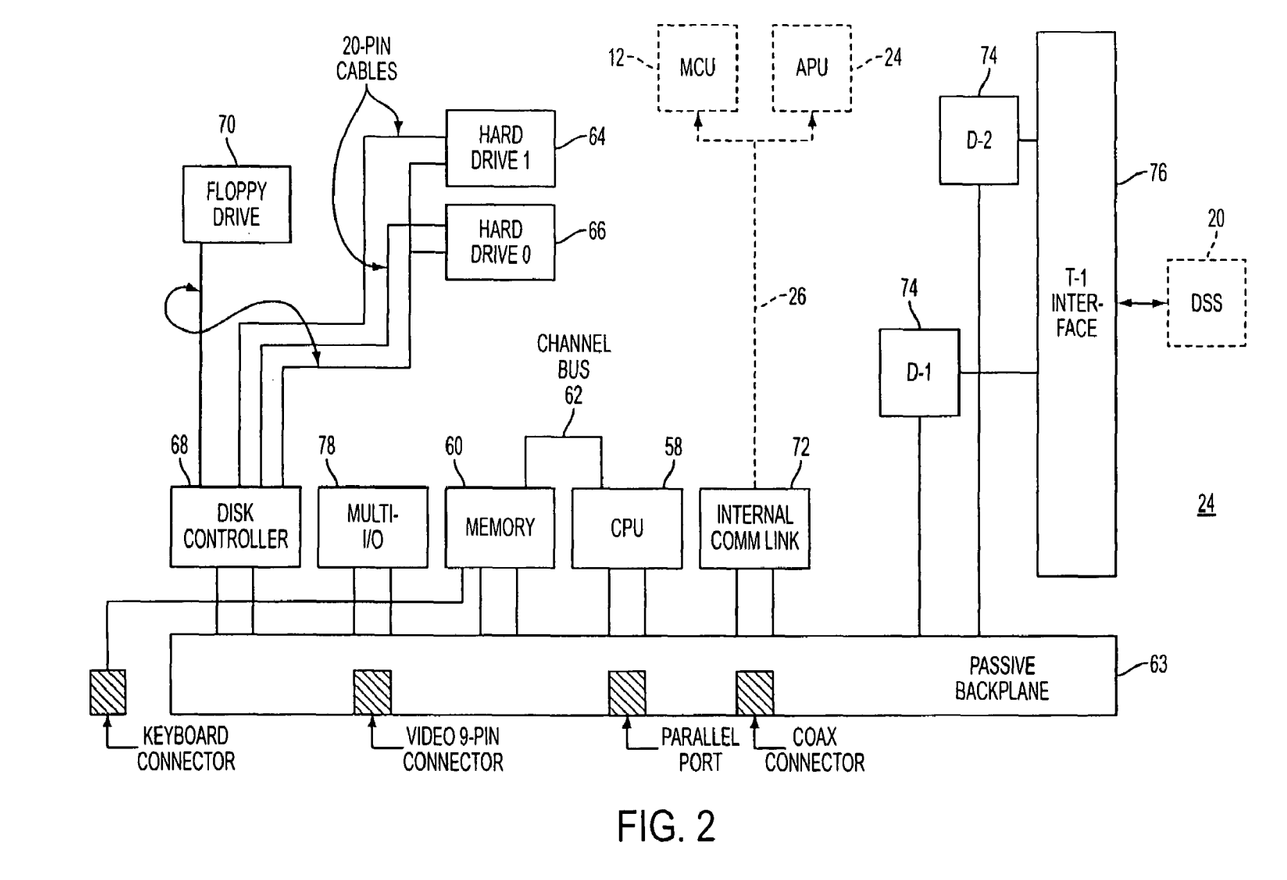
FIG. 2 is a block diagram of a voice processing unit in the information services system illustrated in FIG. 1.

The components of an APU 24 are illustrated in FIG. 2. Control of the APU 24 is provided by a processor (CPU) 58 which is connected via a passive backplane 63 to hard drives 64, 66 via a disk controller 68. The APU 24 is connected via digital switches 74 and a T1 interface 76 to the DSS 20. When the APU 24 provides voice-mail services, the voice messages are stored on the hard drives 64, 66. The CPU 58 is programmed to provide services to subscribers as disclosed in the patents which have been incorporated herein by reference.

Under conventional operation, callers using one of the telephones 80 (FIG. 1) can leave messages for subscribers and subscribers can retrieve their messages on the information services system 10. Each subscriber is assigned a home APU 24 where messages are stored provided a port is available when a caller wants to leave a message for that subscriber. If no ports are available, the message is routed by the DSS 20 to another APU. In either case, the location of the message is stored in the database for the subscriber in the MCU. The basic functions provided to subscribers are listen to, save, forward and delete messages. In addition, a system administrator is given the ability to create and delete mailboxes for subscribers and move the contents of one mailbox to another mailbox. The system administrator also can modify mailbox parameters, such as length of time that messages are retained, maximum number of messages, etc. on individual mailboxes, ranges of mailboxes, or all mailboxes on the information services system 10. Similar capabilities are provided for other information services, such as those provided by facsimile processing units $24_D$–$24_N$.

Figure 3:
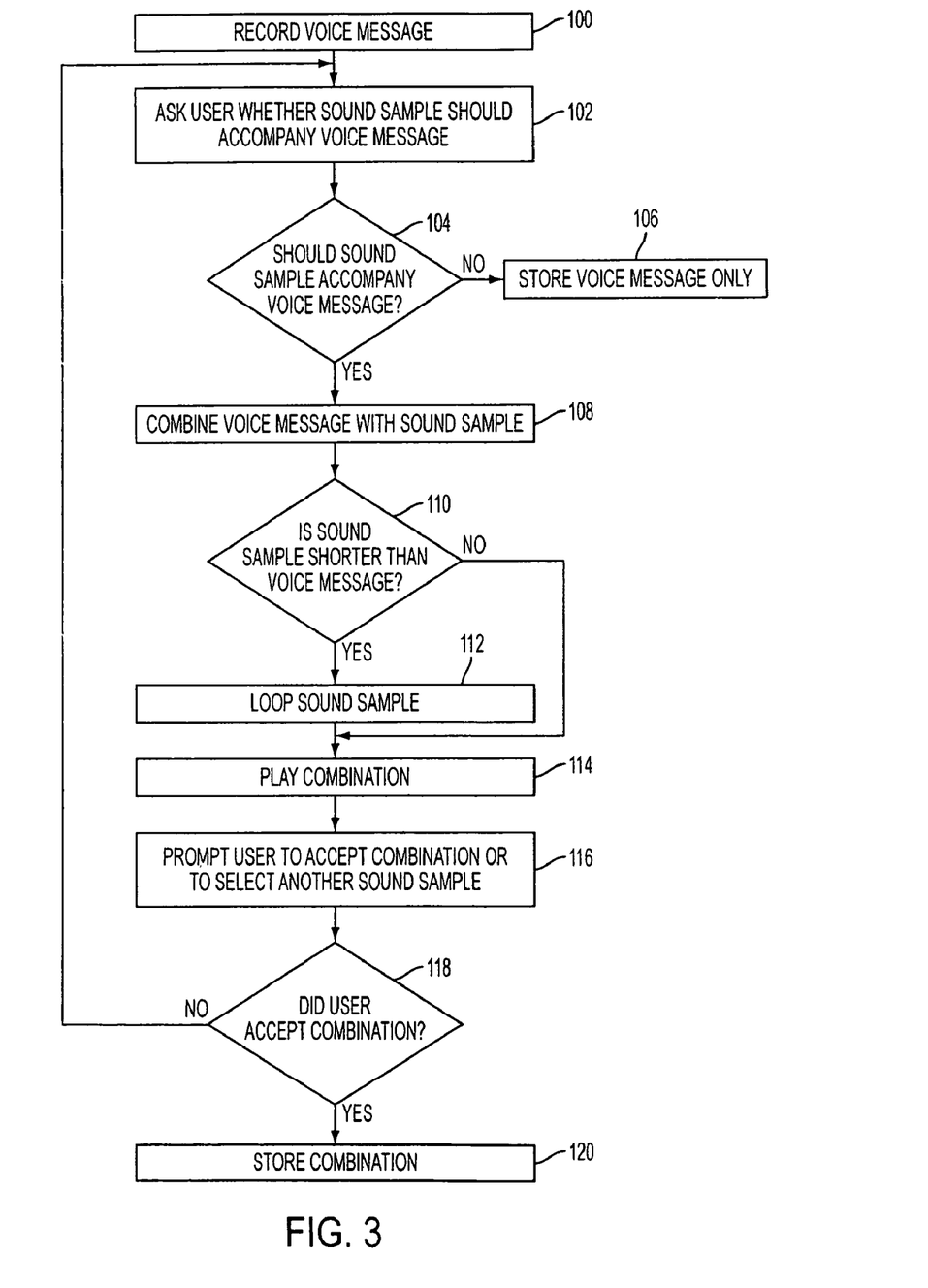
FIG. 3 is a flow chart of a method according to the present invention.

FIG. 3 is a flow chart of an embodiment of the present invention in which voice messages combined with sounds samples may be stored. Referring to FIG. 3, in operation 100 the voice message is recorded by the system. Essentially, this entails the user speaking into the telephone, for example, while the message is recorded by the system. From operation 100, the process moves to operation 102, where the system preferably prompts the user to choose whether a sound sample should accompany the voice message. Typically, this would be accomplished through the use of pre-recorded announcements played over the telephone, for example, to the user.

From operation 102, the process moves to operation 104 where it is determined whether the user wants to add a sound sample to the recorded voice message. The user typically indicates this by pressing one or more number keys on the telephone keypad, for example. If the user wants to add a sound sample to the recorded voice message, the system prompts the user to select a sound sample. Typically, this is done by punching one or more number keys on the telephone key pad, for example.

If it is determined that no sound sample should accompany the voice message, the process moves to operation 106, where only the voice message is stored. However, if it is determined that a sound sample should accompany the voice message, the process moves from operation 104 to operation 108, where the processor combines the voice message with the selected sound sample. Combining the sound sample and the voice message may be accomplished according to many different methods, such as, by adding the respectively signals together. Another option to combine would be to decrease the volume of the sound sample when the volume of the voice message increases.

From operation 108, the process moves to operation 110 where it is determined whether the duration of the sound sample is shorter than the duration of the voice message. If the sound sample is not shorter than the voice message, the process skips operation 112 and moves to operation 114. However, if the sound sample is shorter than the voice message, the process moves to operation 112, where the sound sample is looped such that the sound sample is played for a duration equaling the duration of the voice message. According to an embodiment of the invention, it is preferable that the sound sample be created such that looping the sample appears audibly seamless. For example, in the case of music, the sample should be a musical phrase that can be repeated. In operation 114, the processor plays the combination of the sound sample and the voice message for the user.

From operation 114, the process moves to operation 116, where the processor prompts the user to accept the combination or to select another sample. From operation 116, the process moves to operation 118 where it is determined whether the user accepts the combination.

If the user accepts the combination, the process moves to operation 120, where the combination is stored for subsequent retrieval by a message recipient.

However, if the user does not accept the combination, the process moves back to operation 102, where the user is prompted again to indicate whether the sound sample should accompany the recorded voice message and operations 104 through 118 are performed again.

Figure 4:
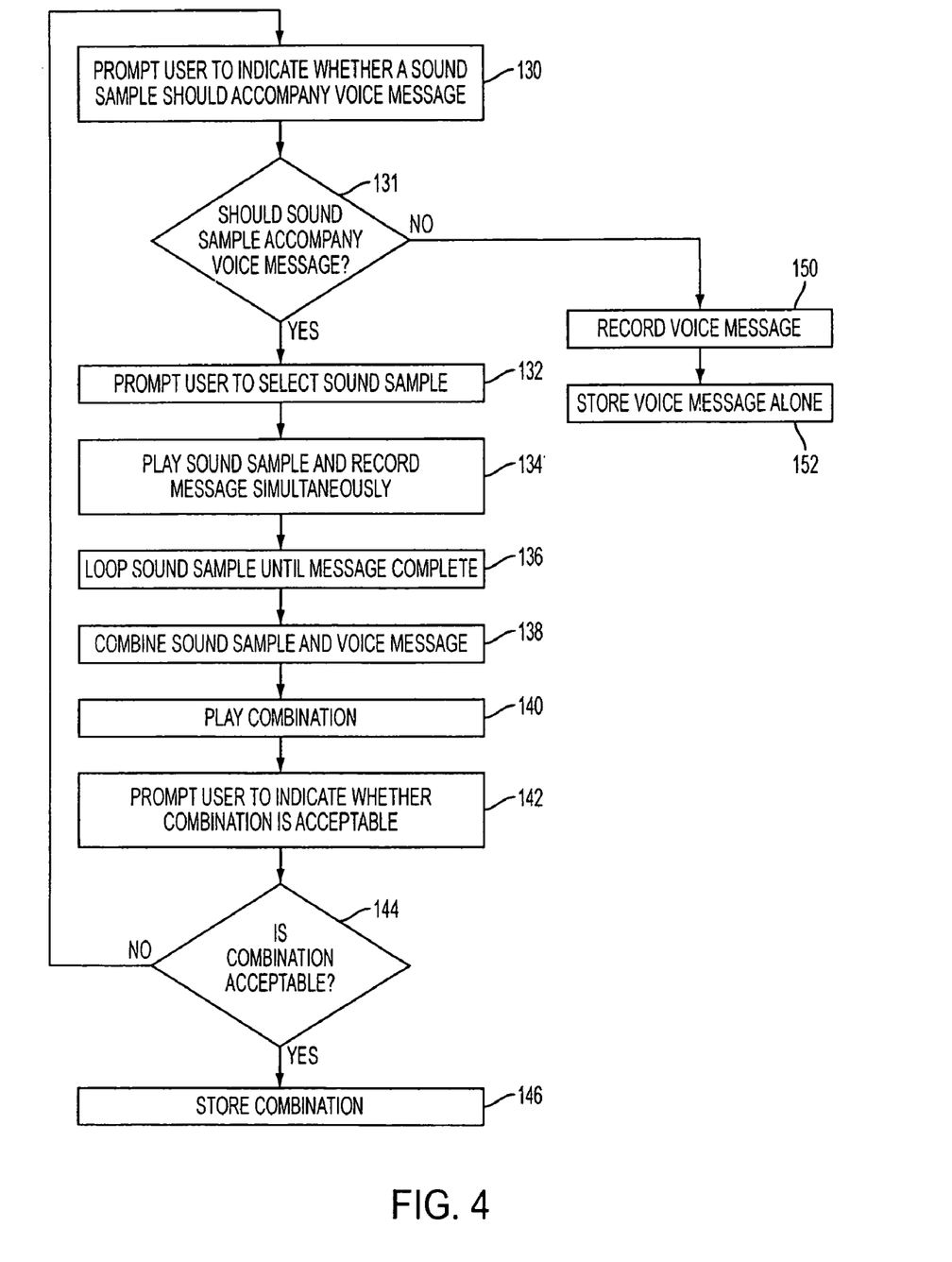
FIG. 4 is a flow chart of a method according to the present invention.

FIG. 4 is a flow chart of a second embodiment of the present invention in which a voice message is stored separately from a sound sample after the sound sample has been selected. Referring to FIG. 4, in operation 130, the user is asked whether a sound sample should accompany a voice message.

From operation 130, the process moves to operation 131, where the processor determines whether the user has chosen to include a sound sample with the voice message. This is accomplished in much the same way as described with reference to FIG. 3.

If in operation 131 the user indicates that a sound sample should be combined with the voice message, the process moves from operation 131 to operation 132, where the user is prompted to make a sound sample selection.

However, if the user does not wish to combine a sound sample with the voice message, the process moves from operation 131 to operation 150 where the voice message is recorded.

From operation 132, the process moves to operation 134 where the processor plays the sound sample while the voice message is recorded simultaneously. In order to accomplish playing the sound sample while simultaneously recording the voice message, a system such as Natural Access by Natural Microsystems can provide full-duplex voice play, record and edit functions.

From operation 134 the process moves to operation 136, where the sound sample is looped until the recording of the voice message is completed. Although not fully illustrated in FIG. 4, this operation is the same as described in conjunction with FIG. 3. Again, it is preferable to select sound samples be created such that looping the sample appears audibly seamless. For example, in the case of music, the sample should be a musical phrase that can be repeated.

From operation 136 the process moves to operation 138, where the sound sample and the voice message are combined. From operation 138 the process moves to operation 140, where the processor plays the combination for the user.

In operation 142 the processor prompts the user to indicate whether the combination is acceptable. In operation 144, it is determined that the user has accepted the combination, the process moves to operation 146, where the combination is stored. According to one embodiment of the present invention, the combination can be stored by combining the sound sample and the voice message prior to storage. Alternatively, the sound sample can be stored together with the voice message in an uncombined format either next to each other in the storage device or linked in some other manner as well known in the art.

If the user does not accept the combination in operation 144, the process moves back to operation 130, where the user is again asked whether a sound sample should accompany the voice message. Operations 131–144 are then executed again.

Figure 5A:
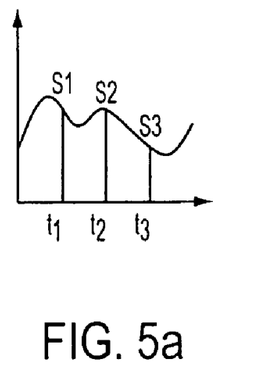
FIG. 5a is a graph of a voice message according to the present invention.
Figure 5B:
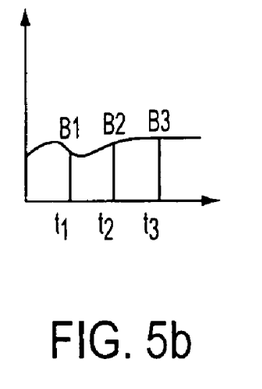
FIG. 5b is a graph of a sound sample according to the present invention.
Figure 5C:
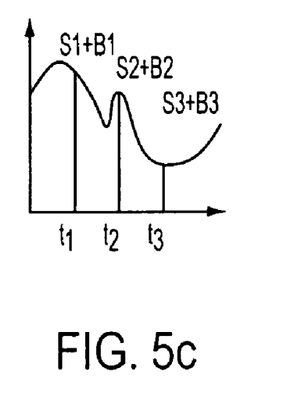
FIG. 5c is a graph of the combined sound sample and voice message according to the present invention.

FIG. 5a is a graph of a voice message according to the present invention. FIG. 5b is a graph of a sound sample according to the present invention. FIG. 5c is a graph of the combined sound sample and voice message. Referring to FIG. 5a, the voice message is graphed with the x-axis representing time and the y-axis representing amplitude. Referring to FIG. 5b, the sound sample is graphed in a similar manner. Now referring to FIG. 5c, according to an embodiment of the present invention, the sound sample and the voice message are added together to combine the two signals into one signal representing the combination message. Thus, at time t1 the combination message is equal to the amplitude of the voice message at time t1 and the amplitude of the sound sample message at time t1, and so on. Thus, FIG. 5c shows the resulting combination message.

Figure 6:
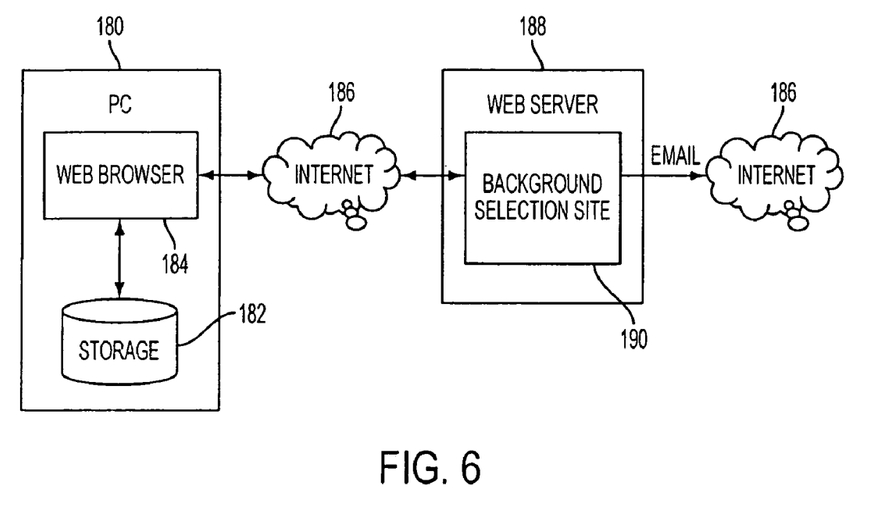
FIG. 6 is a diagram of a web interface according to the present invention.

According to an embodiment of the present invention, by referencing a web site, the user can see a large list of possible sound samples. The user can then select a sound sample, hear it, and then decide if they would like the sound sample to become one of their customized sound samples. These sound samples can be selected using a personal computer 180, as shown in FIG. 6, with a web browser 184 connected to another web server 188 via an Internet connection 186. Thus, after selecting a sound sample, or uploading a sound sample stored in storage device 182, the sound sample is transferred to the background selection site 190 located on web server 188 via Internet 186. It is preferable that the user provide an identifier when transmitting the sound sample. The sound sample is transmitted via the Internet and e-mail, for example, according to another embodiment of the present invention. The user may send the customized sound samples to the voice mail platform in any simple manner known in the art. The user may also access pre-stored sound samples at background selection site 190 via web browser 184 and Internet connection 186.

Figure 7:
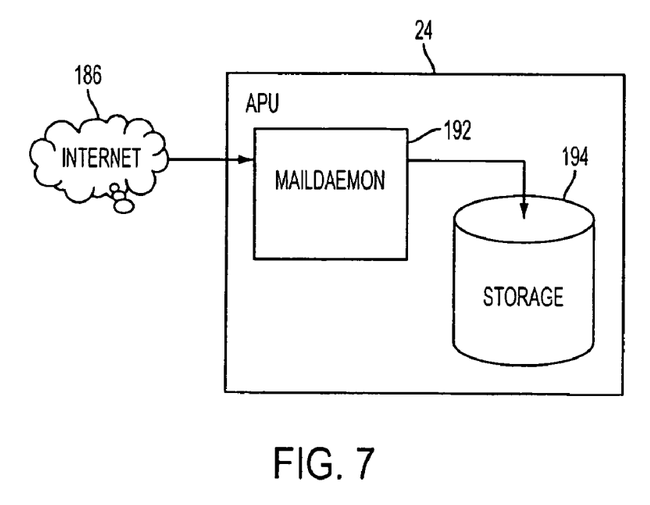
FIG. 7 is a diagram of an web interface with an apparatus of the present invention.

As shown in FIG. 7, the customized sound samples are transmitted via the Internet to APU 24 and specifically, mail daemon 192, which monitors incoming e-mail. When a sound sample message is received, mail daemon 192 extracts the sound data and stores the recording and the associated user identifier in storage device 194.

Figure 8A:
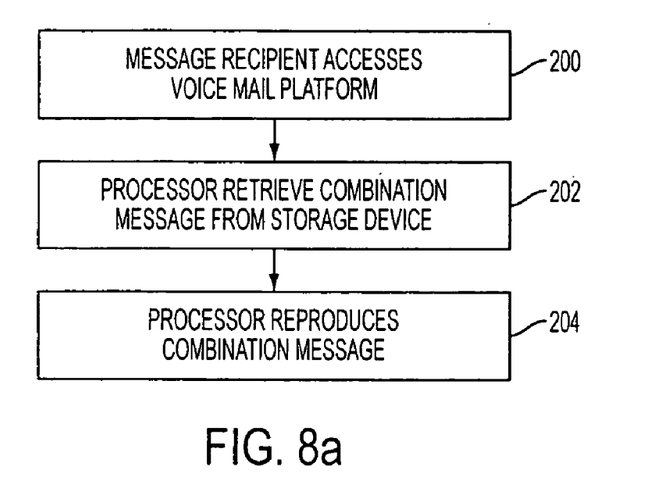
FIGS. 8(a)–8(c) are flow charts of processes in which messages are retrieved according to the present invention.
Figure 8B:
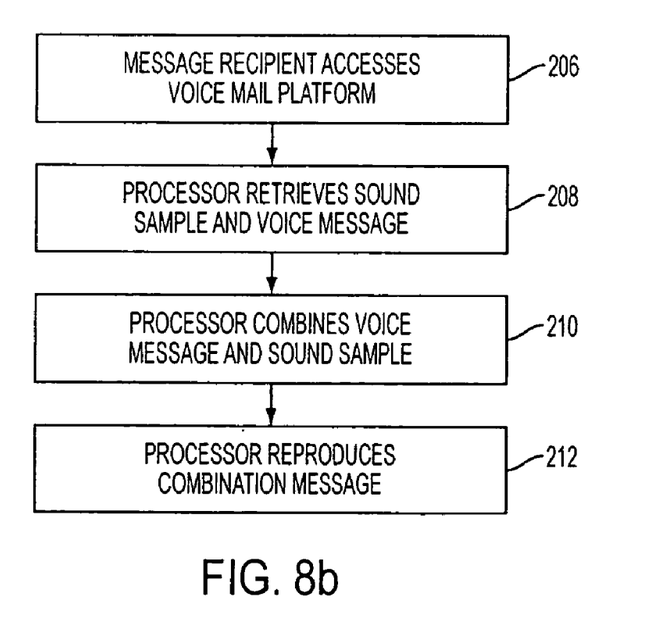
Figure 8C:
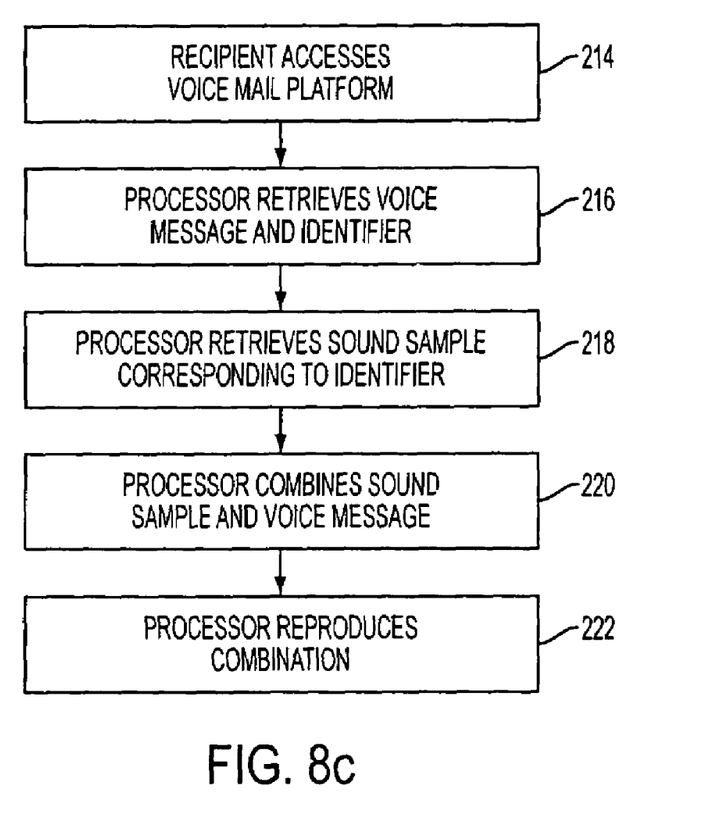

FIGS. 8a–8c are flow charts showing a process in which the recorded voice message and sound sample are played according to an embodiment of the present invention. Referring to FIG. 8a, according to an embodiment of the invention in operation 200, the message recipient accesses the voice mail platform. This can be done by simply calling the voice mail platform and entering an access code, for example. In operation 202, the message recipient retrieves the combination message from the storage device. From operation 202 the process moves to operation 204 where the combination message is played.

Referring to FIG. 8b, in operation 206, the message recipient accesses the voice mail platform. This is done in any manner similar to that which has been described previously.

From operation 206, the recipient retrieves a file containing the sound sample and the voice message, which are not stored in a combined form. From operation 208, the process moves to operation 210 where the voice message and the sound sample are combined as discussed in conjunction with FIG. 3. In operation 212, the combination message is played to the message recipient.

Referring to FIG. 8c, operation 214 is similar to operations 206 and 200 discussed above. In operation 216, the processor accesses the voice message and identifier from the storage device. From operation 216 the process moves to operation 218, where the processor accesses the sound sample corresponding to the identifier retrieved in operation 216. In operation 220, the processor combines the retrieved sound sample and the voice message. From operation 220, the process moves to operation 222 where the combination message is played.

As can be seen in FIGS. 8a–8c, as there are several different embodiments relating to storing the sound sample and the voice message, there are corresponding methods of retrieving and playing the combination message.

Figure 9:
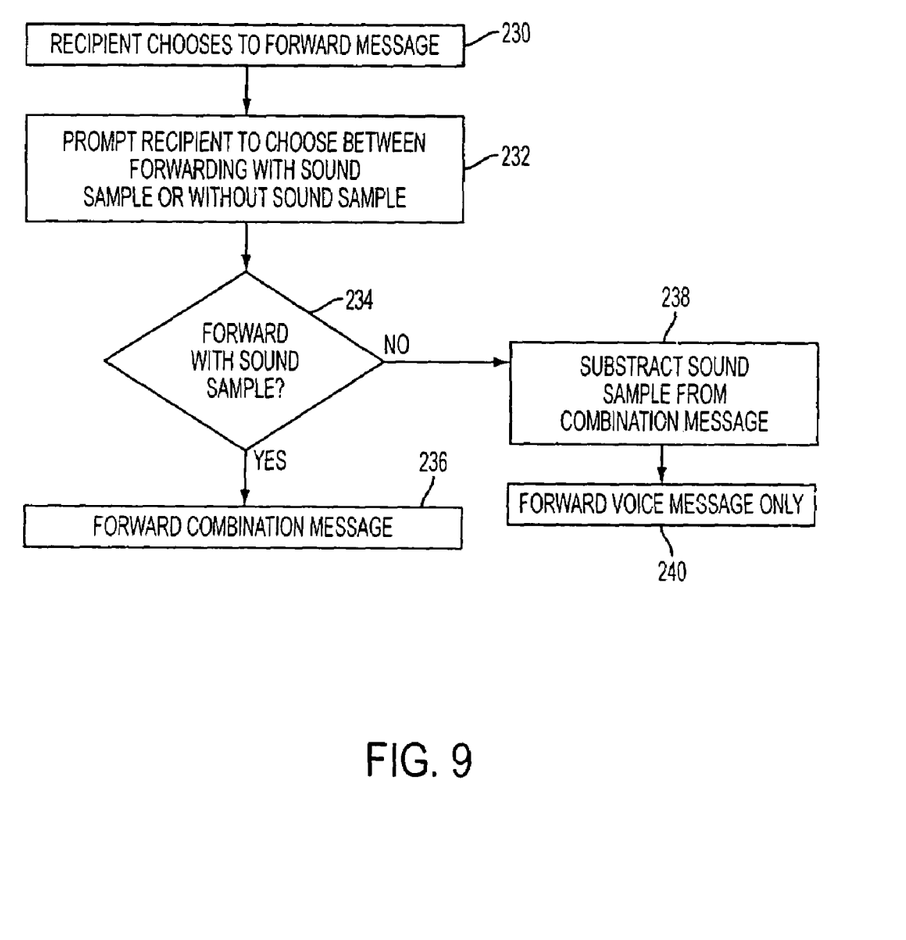
FIG. 9 is a flow chart of a process of forwarding a message according to an embodiment of the present invention.

FIG. 9 is a flow chart of a process of forwarding a message according to an embodiment of the present invention. Referring to FIG. 9, in operation 230, the message recipient chooses to forward the voice mail message. From operation 230, the process moves to operation 232 where the processor prompts the user to choose between forwarding the voice mail message without the sound sample or the combination message including the sound sample. In operation 234, it is determined whether the recipient wishes to forward the combination message with the sound sample.

If the message recipient wishes to forward the combination message, the process moves to operation 236 where the combination message, as it was combined to be played for the recipient, it is forwarded to the third party.

However, if the voice mail recipient chooses to forward the voice mail message without the sound sample, the process moves to operation 238, where the sound sample is subtracted from the combination message. From operation 238, the process moves to operation 240, where the resulting subtracted out voice message is forwarded without the sound sample.

According to another embodiment of the present invention, a user can create audio stationary, which is a specialized way of adding a background sound to a recorded user's message. The audio stationary may include three parts, an audio header, an audio footer and an audio body, or message area. The audio header is preferably added to the beginning of the message, i.e., before the user's recorded message. The message area can be added just once, or looped if the user's message is longer than the message area. The audio footer is added to the end of the message, after the user's recorded message. For example, a user may select audio stationary having a loud harp swell for the audio header, softer harp music for the message area and a harp decrescendo for the audio footer. Of course, each of these parts are optional. For example, a subscriber might select audio stationary containing a thunder crash for the audio header and no audio footer or message area. The audio stationary is combined with a recorded message by the user in accordance with the teachings herein.

Although the above descriptions of the present invention relate specifically to a user leaving a recorded voice message for a message recipient and adding sound samples to the recorded message, it is also within the scope of this invention to provide a message recipient with a selection of sound samples and, after the recipient has selected a sound sample, combining the selected sound sample with a recorded greeting to form a combination greeting. All of the methods disclosed above with respect to the user recording the voice mail message and audio stationary are also applicable to the recipient recording a greeting. Thus, for example, the recipient may also record an entire greeting on a personal computer which may then may then be uploaded or transferred to the voice-mail system in the same manner described above with respect to the user's recorded message. Thus, the recipient may personalize a greeting by adding background sounds to the greeting in the same ways that a user can personalize a voice message by adding background sounds.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of adding background sound to a voice mail message, comprising:
   providing sound samples for selection by a user;
   receiving an indication of a selected sound sample; and
   combining the selected sound sample with a recorded voice message to form a combination message, and
   looping the selected sound sample as background sound upon determining a time duration of the selected sound sample is less than a time duration of the selected sound sample.

2. The method according to claim 1, wherein the providing occurs after the voice message is recorded.

3. The method according to claim 1, wherein the providing occurs before the voice message is recorded.

4. The method according to claim 3, further comprising playing the selected sound sample to the user while the user records the voice message.

5. The method according to claim 4, further comprising playing the combination message to the user.

6. The method according to claim 5, further comprising prompting the user to select one of storing the combination message and repeating the providing until the user selects storing the combination message.

7. The method according to claim 1, further comprising storing the combination message.

8. The method according to claim 7, further comprising depositing the stored combination message in a mailbox of a recipient.

9. The method according to claim 8, wherein the recipient performs at least one of retrieving and listening to the combination message and forwarding the combination message to a third-party recipient.

10. The method according to claim 9, further comprising the recipient separating the recorded voice message from the selected sound sample.

11. The method according to claim 10, further comprising the recipient playing the separated recorded voice message without the selected sound sample.

12. The method according to claim 11, further comprising the recipient forwarding the separated recorded voice message without the selected sound sample to the third-party recipient.

13. The method according to claim 1, wherein the combining includes adding the selected sound sample to the recorded voice message.

14. The method according to claim 1, further comprising playing the combination message after the combining is completed.

15. The method according to claim 1, wherein the looping the selected sound sample is for a time duration equal to a time duration of the recorded voice message.

16. The method according to claim 1, further comprising receiving the sound samples from the user.

17. The method according to claim 1, further comprising listing the sound samples at a web site.

18. The method according to claim 17, further playing the sounds samples through the web site.

19. The method according to claim 18, further comprising receiving at least one sound sample from the user via the web site.

20. The method according to claim 1, further comprising storing the recorded voice message with an identifier corresponding to the selected sound sample.

21. The method according to claim 20, further comprising:
   retrieving the stored voice message and the identifier;
   retrieving the sound sample corresponding to the identifier;
   combining the selected sound sample and the recorded voice message; and
   reproducing the combination for a recipient.

22. The method according to claim 1, further comprising storing the selected sound sample together with the recorded voice message in a storage device.

23. The method according to claim 22, wherein the selected sound sample and the recorded voice message are stored next to each other in the storage device.

24. The method according to claim 22, wherein the selected sound sample and the recorded voice message are linked together in the storage device.

25. The method according to claim 22, further comprising:
   retrieving the stored sound sample and the recorded voice message;
   combining the stored sound sample and the recorded voice message; and
   reproducing the combination for a recipient.

26. An apparatus comprising:
   a storage device storing a recorded voice message and sound samples; and
   a processor, coupled to the storage device, to provide the sound samples to a user and to combine a selected sound sample with the recorded voice message to form a combination message, wherein upon the selected sound sample being selected as background sound and upon determining a time duration of the selected sound sample is less than the a time duration of the selected sound sample, the selected sound sample is looped.

27. The apparatus according to claim 26, wherein the storage device stores the combination message.

28. The apparatus according to claim 27, wherein the processor provides access to the combination message stored in the storage device.

29. The apparatus according to claim 26, wherein the processor plays the selected sound sample while the voice message is being recorded by the user.

30. The apparatus according to claim 26, wherein the processor stores the voice message in the storage device with an identifier corresponding to the selected sound sample.

31. The apparatus according to claim 30, wherein the processor prompts the user to select another one of the sound samples and replaces the identifier corresponding to the selected sound sample with an identifier corresponding to the another one of the sound samples.

32. The apparatus according to claim 30, wherein when a message recipient accesses the storage device to retrieve the recorded voice message, the processor retrieves the selected sound sample corresponding to the identifier from the storage device, combines the selected sound sample with the recorded voice message and reproduces the combination for a recipient.

33. The apparatus according to claim 26, wherein
the storage device stores an audio stationary file corresponding to the user, the audio stationary file including at least one of an audio header, an audio footer and an audio body, and
the processor combines the recorded voice message with the audio body, adds the audio header to a beginning of the voice message and adds the audio footer to an end of the voice message.

34. The apparatus according to claim 26, further comprising a web interface, wherein the sound samples are listed at a web site connected to the apparatus via the web interface and the processor receives the selected sound sample, together with an identifier corresponding to the user, via the web interface.

35. The apparatus according to claim 34, wherein the processor receives additional sound samples from the user.

36. The apparatus according to claim 34, wherein the processor extracts sound data corresponding to the selected sound sample and stores the sound data in the storage device together with the identifier corresponding to the user.

37. The apparatus according to claim 26, wherein the processor records at least one sound sample provided via a communication device by the user and stores the at least one sound sample in the storage device with an identifier corresponding to the user.

38. A voice mail platform comprising:
means for providing sound samples for selection by a user;
means for receiving an indication of a selected sound sample;
means for combining a selected sound sample with a recorded voice message to form a combination message; and
means for looping the selected sound sample upon the selected sound sample being a background sound.

39. A method of providing ambient sound to a recorded voice message, comprising:
receiving a call from a caller;
prompting the caller to select a sound sample;
recording a voice message from the caller;
adding the voice message to the selected sound sample to form a combination message, wherein the sound sample is looped for a duration equaling a duration of the voice message; and
storing the combination message in a storage device.

40. A method of adding background sound to a greeting, comprising:
providing sound samples for selection by a recipient;
receiving an indication of a selected sound sample;
combining the selected sound sample with a recorded greeting to form a combination greeting; and
looping the background sound.

41. A method of combining sound with a recorded voice message comprising:
recording a voice message from a caller;
prompting the caller to select one of a plurality of sound samples; and
combining the voice message with the selected sound sample to form a combination message, the selected sound sample being looped for a duration corresponding to a duration of the voice message.

* * * * *

UNITED STATES PATENT AND TRADEMARK OFFICE
CERTIFICATE OF CORRECTION

| | | |
|---|---|---|
| PATENT NO. | : 7,203,286 B1 | Page 1 of 1 |
| APPLICATION NO. | : 09/679287 | |
| DATED | : April 10, 2007 | |
| INVENTOR(S) | : Allan E. Brockenbrough | |

It is certified that error appears in the above-identified patent and that said Letters Patent is hereby corrected as shown below:

Column 8, Line 44, Claim 26, after "than the" delete "a".

Title Page, Column 2 (U.S. Patent Documents), Line 4, change
"5,865,825    2/1999    Schlinz    ……………..715/500.1" to
--5,856,825    1/1999    Yumoto et al.    ……………...715/500.1--.

Signed and Sealed this

Sixth Day of May, 2008

JON W. DUDAS
*Director of the United States Patent and Trademark Office*